US012561534B2

(12) United States Patent
Li et al.

(10) Patent No.: US 12,561,534 B2
(45) Date of Patent: Feb. 24, 2026

(54) MODEL TRAINING METHODS AND APPARATUSES, TEXT PROCESSING METHODS AND APPARATUSES, AND COMPUTER DEVICES

(71) Applicant: ALIPAY (HANGZHOU) INFORMATION TECHNOLOGY CO., LTD., Zhejiang (CN)

(72) Inventors: Mingzhe Li, Hangzhou (CN); Xiexiong Lin, Hangzhou (CN); Jinxiong Chang, Hangzhou (CN); Qishen Zhang, Hangzhou (CN); Zhongyi Liu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 309 days.

(21) Appl. No.: 18/316,467

(22) Filed: May 12, 2023

(65) Prior Publication Data

US 2023/0367976 A1 Nov. 16, 2023

(30) Foreign Application Priority Data

May 12, 2022 (CN) .......................... 202210513283.4

(51) Int. Cl.
*G06F 17/00* (2019.01)
*G06F 40/30* (2020.01)
*G06F 40/56* (2020.01)

(52) U.S. Cl.
CPC .............. *G06F 40/56* (2020.01); *G06F 40/30* (2020.01)

(58) Field of Classification Search
None
See application file for complete search history.

(56) References Cited

U.S. PATENT DOCUMENTS

| | | | | |
|---|---|---|---|---|
| 11,080,483 B1 * | 8/2021 | Islam | ...................... | G06F 16/35 |
| 11,232,270 B1 * | 1/2022 | Platt | ...................... | G06N 20/00 |
| 11,586,829 B2 * | 2/2023 | Mishra | .................... | G06F 40/56 |

(Continued)

FOREIGN PATENT DOCUMENTS

| | | |
|---|---|---|
| CN | 111382563 A | 7/2020 |
| CN | 113408299 A | 9/2021 |

(Continued)

*Primary Examiner* — Satwant K Singh
(74) *Attorney, Agent, or Firm* — Fish & Richardson P.C.

(57) ABSTRACT

Computer-implemented methods, apparatuses, and computer-readable media for model training and text processing are disclosed. In an example, an original text, a positive sample, and a negative sample are obtained. The positive sample and the negative sample are rewritten texts of the original text. A first, second, and third distribution parameter corresponding to the original text, the positive sample, and the negative sample, respectively, are determined by using an encoder. The first, second, and third distribution parameter are used to describe a first, second, and third semantic distribution, respectively. A model parameter of the encoder is optimized by using a loss function based on the first, second, and third distribution parameter. The loss function includes a first term that is used to constrain a degree of similarity between the first and second semantic distribution to be higher than a degree of similarity between the first and the third semantic distribution.

16 Claims, 6 Drawing Sheets

(56)         References Cited

U.S. PATENT DOCUMENTS

2017/0109340 A1*   4/2017  Chen ..................... G06F 40/151
2020/0110797 A1*   4/2020  Melnyk ................... G06F 40/30
2020/0193097 A1*   6/2020  Xiong .................. G06N 3/0455
2021/0081799 A1*   3/2021  Johnson ............... G06N 3/0495
2023/0100376 A1    3/2023  Liu et al.
2023/0137209 A1*   5/2023  Nangi .................. G06F 40/166
                                                   704/9
2023/0274100 A1*   8/2023  Garcia ................. G06F 40/166
                                                   715/229
2024/0062006 A1*   2/2024  Li .......................... G06F 40/30
2024/0347044 A1*  10/2024  Liu .......................... G06N 3/08

FOREIGN PATENT DOCUMENTS

CN         114154481  A     3/2022
CN         114328814  A     4/2022
CN         114330704  A     4/2022

* cited by examiner

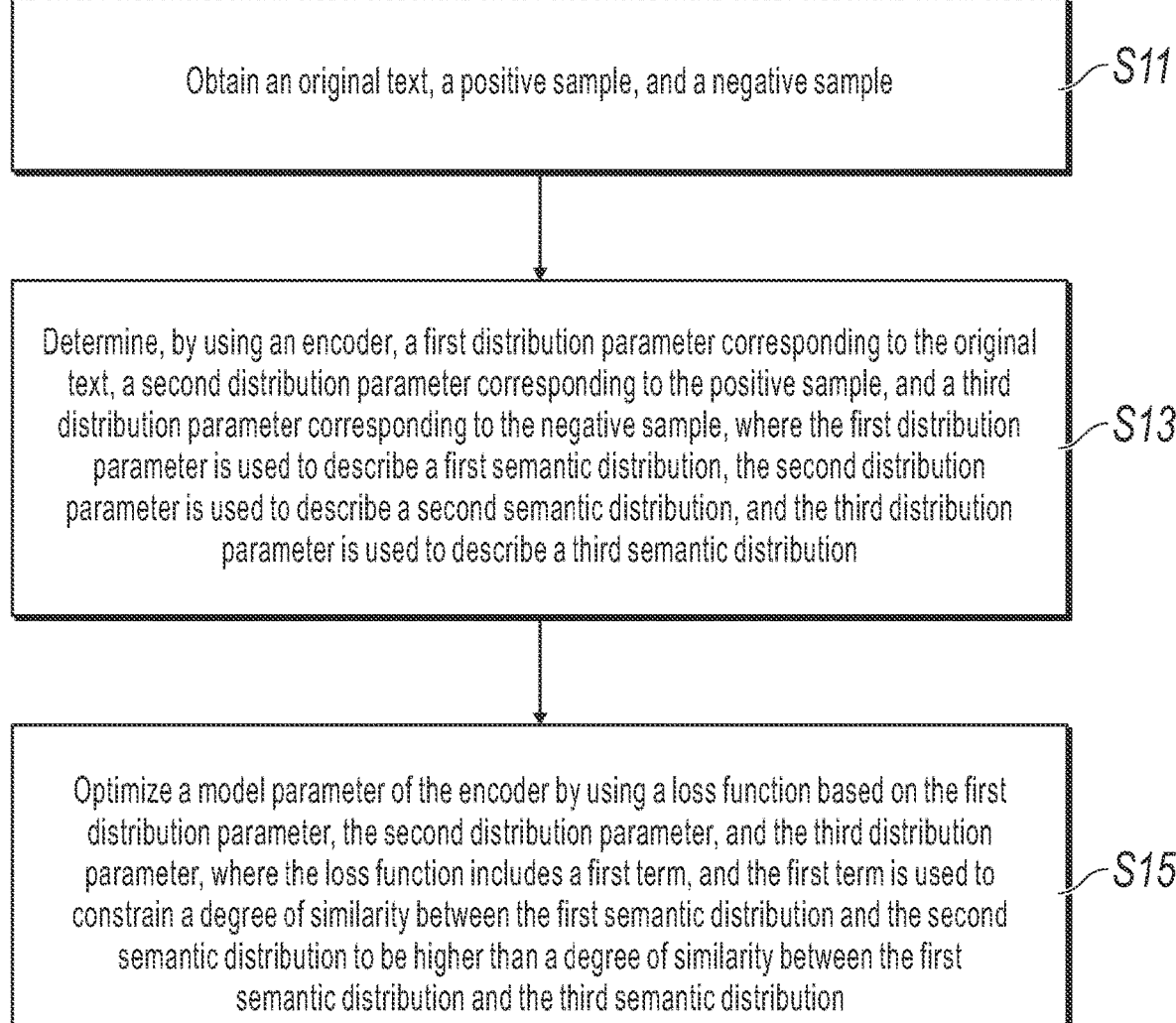

Obtain an original text, a positive sample, and a negative sample ⎫⌐S11

Determine, by using an encoder, a first distribution parameter corresponding to the original text, a second distribution parameter corresponding to the positive sample, and a third distribution parameter corresponding to the negative sample, where the first distribution parameter is used to describe a first semantic distribution, the second distribution parameter is used to describe a second semantic distribution, and the third distribution parameter is used to describe a third semantic distribution ⎫⌐S13

Optimize a model parameter of the encoder by using a loss function based on the first distribution parameter, the second distribution parameter, and the third distribution parameter, where the loss function includes a first term, and the first term is used to constrain a degree of similarity between the first semantic distribution and the second semantic distribution to be higher than a degree of similarity between the first semantic distribution and the third semantic distribution ⎫⌐S15

FIG. 1

Input an original text into an encoder to obtain a distribution parameter — S21

Perform sampling on a semantic distribution to obtain a latent variable — S23

Input the latent variable into a decoder to obtain a rewritten text — S25

1

MODEL TRAINING METHODS AND APPARATUSES, TEXT PROCESSING METHODS AND APPARATUSES, AND COMPUTER DEVICES

CROSS-REFERENCE TO RELATED APPLICATION

This application is claims priority to Chinese Patent Application No. 202210513283.4, filed on May 12, 2022, which is hereby incorporated by reference in its entirety.

TECHNICAL FIELD

Embodiments of this specification relate to the field of computer technologies, and in particular, to model training methods and apparatuses, text processing methods and apparatuses, and computer devices.

BACKGROUND

Deep learning has gradually become a mainstream service processing method in the industry, and can be used for natural language processing. With the development of Internet technologies, increasingly high performance requirements are imposed on machine learning models. Therefore, it is necessary to provide a model training method so that trained machine learning models have high performance, for example, high accuracy.

SUMMARY

Embodiments of this specification provide model training methods and apparatuses, text processing methods and apparatuses, and computer devices. The embodiments of this specification can implement model training. In addition, the embodiments of this specification can further rewrite an original text.

According to a first aspect of the embodiments of this specification, a model training method is provided, including: an original text, a positive sample, and a negative sample are obtained, where the positive sample and the negative sample are rewritten texts of the original text; a first distribution parameter corresponding to the original text, a second distribution parameter corresponding to the positive sample, and a third distribution parameter corresponding to the negative sample are determined by using an encoder, where the first distribution parameter is used to describe a first semantic distribution, the second distribution parameter is used to describe a second semantic distribution, and the third distribution parameter is used to describe a third semantic distribution; and a model parameter of the encoder is optimized by using a loss function based on the first distribution parameter, the second distribution parameter, and the third distribution parameter, where the loss function includes a first term, and the first term is used to constrain a degree of similarity between the first semantic distribution and the second semantic distribution to be higher than a degree of similarity between the first semantic distribution and the third semantic distribution.

According to a second aspect of the embodiments of this specification, a text processing method is provided, including: an original text is input into an encoder to obtain a distribution parameter, where the encoder is obtained through training by using the method according to the first aspect, and the distribution parameter is used to describe a semantic distribution; sampling is performed on the semantic distribution to obtain a latent variable; and the latent variable is input into a decoder to obtain a rewritten text.

According to a third aspect of the embodiments of this specification, a model training apparatus is provided, the text generative model includes an encoder, and the apparatus includes the following: an acquisition unit, configured to obtain an original text, a positive sample, and a negative sample, where the positive sample and the negative sample are rewritten texts of the original text; a determining unit, configured to determine, by using an encoder, a first distribution parameter corresponding to the original text, a second distribution parameter corresponding to the positive sample, and a third distribution parameter corresponding to the negative sample, where the first distribution parameter is used to describe a first semantic distribution, the second distribution parameter is used to describe a second semantic distribution, and the third distribution parameter is used to describe a third semantic distribution; and an optimization unit, configured to optimize a model parameter of the encoder by using a loss function based on the first distribution parameter, the second distribution parameter, and the third distribution parameter, where the loss function includes a first term, and the first term is used to constrain a degree of similarity between the first semantic distribution and the second semantic distribution to be higher than a degree of similarity between the first semantic distribution and the third semantic distribution.

According to a fourth aspect of the embodiments of this specification, a text processing apparatus is provided, including: a first input unit, configured to input an original text into an encoder to obtain a distribution parameter, where the encoder is obtained through training by using the method according to the first aspect, and the distribution parameter is used to describe a semantic distribution; a sampling unit, configured to perform sampling on the semantic distribution to obtain a latent variable; and a second input unit, configured to input the latent variable into a decoder to obtain a rewritten text.

According to a fifth aspect of the embodiments of this specification, a computer device is provided, including: at least one processor; and a memory storing program instructions, where the program instructions are configured to be suitable for execution by the at least one processor, and the program instructions include instructions for performing the method according to the first aspect or the second aspect.

According to the technical solutions provided in the embodiments of this specification, a training effect can be improved by contrastive learning. In addition, according to the technical solutions provided in the embodiments of this specification, a text can further be rewritten.

BRIEF DESCRIPTION OF DRAWINGS

To describe the technical solutions in the embodiments of this specification or in the existing technology more clearly, the following briefly describes the accompanying drawings needed for describing the embodiments or the existing technology. The accompanying drawings in the following description merely show some embodiments of this specification, and a person of ordinary skill in the art can still derive other drawings from these accompanying drawings without creative efforts.

FIG. 1 is a schematic flowchart illustrating a model training method, according to an embodiment of this specification;

DESCRIPTION OF EMBODIMENTS

Figure 2:
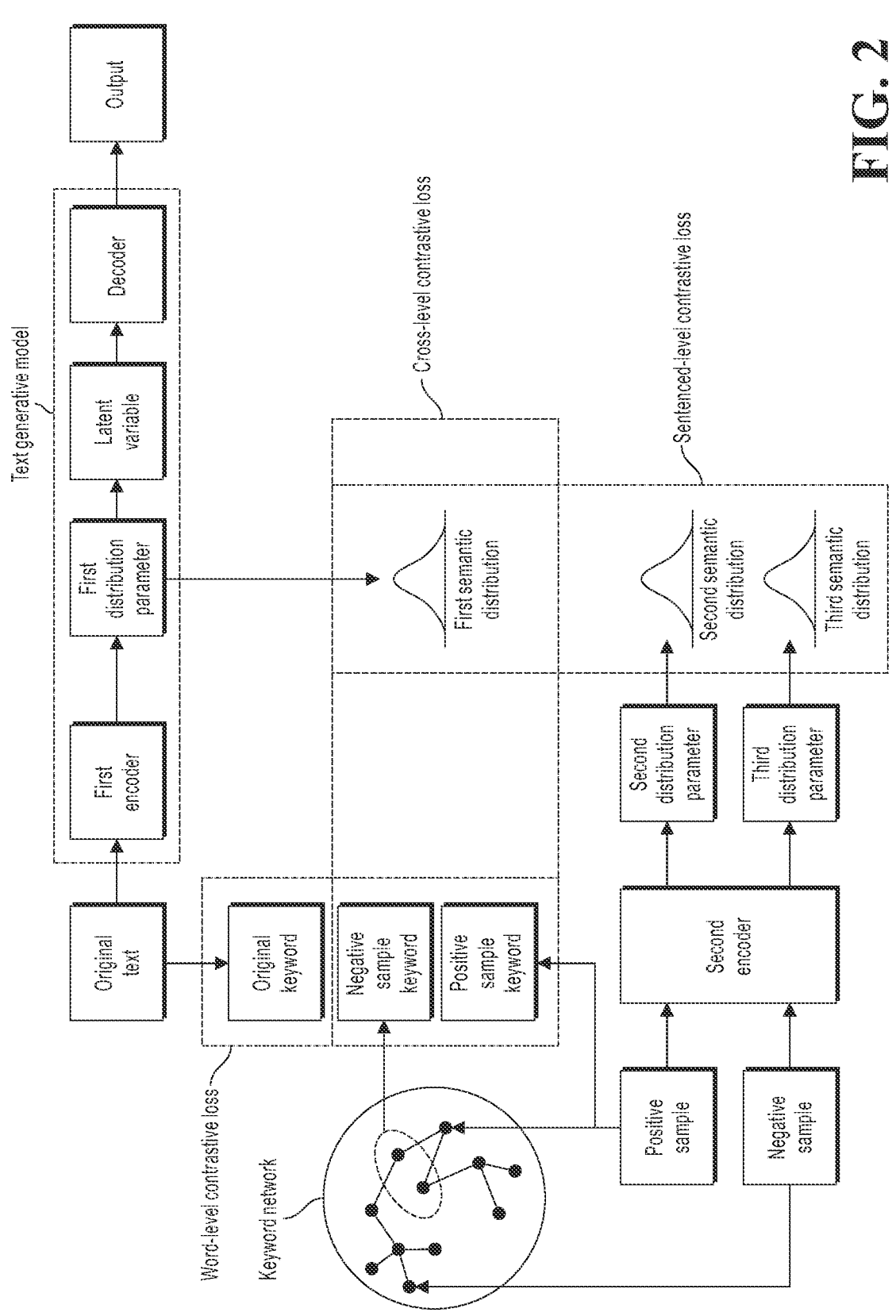
FIG. 2 is a schematic diagram illustrating a training process of a model, according to an embodiment of this specification.

The following clearly and comprehensively describes the technical solutions in the embodiments of this specification with reference to the accompanying drawings in the embodiments of this specification. Clearly, the described embodiments are merely some rather than all of the embodiments of this specification. All other embodiments obtained by a person of ordinary skill in the art based on the embodiments of this specification without creative efforts shall all fall within the protection scope of this specification.

In natural language processing scenarios, it is often necessary to rewrite an expression form of an original text. For example, in a search system, semantics expressed by a search text input by a user is inaccurate due to a language habit. A rewritten text can be obtained based on the search text. Semantics expressed by the rewritten text is comparatively accurate. Thus, a search result can be fed back to the user based on the rewritten text.

In a related technology, a text generative model can be trained by "teacher forcing". A rewritten text corresponding to an original text can be generated based on the trained text generative model. However, training the text generative model by "teacher forcing" causes an exposure bias problem. For example, in a training phase, the text generative model predicts the next word based on the previous word in a training sample; and in an application phase, the text generative model predicts the next word based on the previous word predicted by itself. In the training phase, the text generative model never predicts the next word based on the previous word predicted by itself. Therefore, in the application phase, if the previous word predicted is wrong, the next word is also wrong accordingly, resulting in error accumulation.

The text generative model involved in the embodiments of this specification can include a generative model such as a variational auto encoder (VAE) or a conditional variational auto encoder (CVAE). Certainly, the text generative model involved in the embodiments of this specification can further include another generative model. For example, the text generative model can further include generative adversarial networks (GAN). The text generative model can rewrite an original text into a new text (hereinafter referred to as a rewritten text). Semantics of the rewritten text is the same as semantics of the original text. In addition, the semantics expressed by the rewritten text is more accurate than the semantics of the original text. The text generative model can include an encoder and a decoder. The encoder is configured to output a distribution parameter based on the original text.

The distribution parameter is used to describe a semantic distribution corresponding to the original text. A latent variable can be obtained by performing sampling on the semantic distribution. The decoder is configured to output the rewritten text based on the latent variable. The encoder and the decoder can be neural network models. The neural network models can include multilayer perceptron (MLP) models or convolutional neural network (CNN) models, etc.

Embodiments of this specification provide a model training method. The model training method can be used to train the text generative model. In particular, the model training method can train only the encoder in the text generative model. Or the model training method can train both the encoder and the decoder in the text generative model. The model training method can be applied to a computer device. The computer device includes, but is not limited to, a personal computer, a server, and a server cluster including multiple servers. Reference can be made to both FIG. 1 and FIG. 2. The model training method includes the following steps.

Step S11: Obtain an original text, a positive sample, and a negative sample.

In some embodiments, the original text, the positive sample, and the negative sample can have an association. The positive sample and the negative sample can be rewritten texts of the original text. The positive sample can be a rewritten text of higher quality. Semantics of the positive sample is the same as semantics of the original text. The semantics expressed by the positive sample is more accurate than the semantics of the original text. The negative sample can be a rewritten text of lower quality. Semantics of the negative sample is different from the semantics of the original text. Or the semantics expressed by the negative sample is less accurate than the semantics of the original text.

The original text, the positive sample, and the negative sample can each include a sentence or a paragraph composed of multiple sentences, etc. The sentence can include one or more keywords. The keywords each can include one or more words.

For example, the original text can be "China Merchants Bank credit card application", the positive sample can be "CMB credit card application", and the negative sample can be "Merchants credit card application handling". For another example, the original text can be "iQIYI monthly package", the positive sample can be "iQIYI membership", and the negative sample can be "iQIYI VIP".

There can be one or more said original texts, one or more said positive samples, and one or more said negative samples. The positive sample does not have to have a label. Or the positive sample can have a corresponding label. The negative sample does not have to have a label. Or the negative sample can have a corresponding label. The label can be used to distinguish between the positive sample and the negative sample. The label can be selected from 0 and 1. For example, the label corresponding to the positive sample can be 0, and the label corresponding to the negative sample can be 1. Here, 0 and 1 are merely examples. In practical applications, the label can alternatively be in another form.

In some embodiments, the original text, the positive sample, and the negative sample can be obtained by collection. For example, a search text input by a user can be collected from a search log and used as the original text; a rewritten text that significantly improves quality of a search result can be collected from a search log and used as the positive sample; and a rewritten text that does not significantly improve quality of a search result can be collected from a search log and used as the negative sample. Or another device can send the original text, the positive sample, and the negative sample to the computer device. The computer device can receive the original text, the positive sample, and the negative sample that are sent by the another device. Or a machine learning model can be used to generate the corresponding positive and negative samples for the original sample.

Step S13: Determine, by using an encoder, a first distribution parameter corresponding to the original text, a second distribution parameter corresponding to the positive sample, and a third distribution parameter corresponding to the negative sample, where the first distribution parameter is used to describe a first semantic distribution, the second distribution parameter is used to describe a second semantic distribution, and the third distribution parameter is used to describe a third semantic distribution.

In some embodiments, the first semantic distribution, the second semantic distribution, and the third semantic distribution can include normal distributions. The first distribution parameter, the second distribution parameter, and the third distribution parameter each can include a mean value and a variance. Certainly, the first semantic distribution, the second semantic distribution, and the third semantic distribution can alternatively be other probability distributions, and correspondingly, the first distribution parameter, the second distribution parameter, and the third distribution parameter can alternatively be other distribution parameters. For example, the first semantic distribution, the second semantic distribution, and the third semantic distribution can alternatively include uniform distributions. The first distribution parameter, the second distribution parameter, and the third distribution parameter can include boundary parameters.

A semantic distribution is used to represent a semantic space that a text belongs to, and different points on the semantic distribution can represent different text expression forms with the same semantics. The first semantic distribution is used to represent a semantic space that the original text belongs to, and therefore can be understood as a prior distribution. The second semantic distribution is used to represent a semantic space that the positive sample belongs to, and therefore can be understood as a posterior distribution. The third semantic distribution is used to represent a semantic space that the negative sample belongs to, and therefore can be understood as a posterior distribution.

In some embodiments, the encoder can include a first encoder and a second encoder. The first encoder can be an encoder in a text generative model. In some scenario examples, the text generative model can include a conditional variational auto encoder. The second encoder can be an auxiliary encoder, and can be used to assist in training of the text generative model. Model structures of the second encoder and the first encoder can be the same or different. The first distribution parameter can be obtained by using the first encoder. The second distribution parameter and the third distribution parameter can be obtained by using the second encoder.

The original text can be input into the first encoder to obtain the first distribution parameter. Or a keyword in the original text can be used as a condition for constraining the first semantic distribution. Adding the constraint condition is advantageous for the encoder to determine more accurate information, thereby improving an output of the encoder. Specifically, a keyword in the original text and the original text can be concatenated and then input into the first encoder to obtain the first distribution parameter. The keyword in the original text can include an entity keyword. Named entity recognition (NER) can be performed on the original text to obtain an entity keyword. The entity keyword is used to represent an entity having a particular meaning, for example, a person name, a place name, or a proprietary noun. The concatenation can include splicing. For example, the keyword in the original text and the original text can be spliced and then input into the first encoder.

The positive sample can be input into the second encoder to obtain the second distribution parameter. Or the label corresponding to the positive sample can be used as a condition for constraining the second semantic distribution. Adding the constraint condition is advantageous for the encoder to determine more accurate information, thereby improving an output of the encoder. Specifically, the label corresponding to the positive sample and the positive sample can be concatenated and then input into the second encoder to obtain the second distribution parameter. Or the original text and the label corresponding to the positive sample can be used as a condition for constraining the second semantic distribution. Specifically, the original text, the label corresponding to the positive sample, and the positive sample can be concatenated and then input into the second encoder to obtain the second distribution parameter. The concatenation can include splicing. For example, the label corresponding to the positive sample and the positive sample can be spliced and then input into the second encoder. For another example, the original text, the label corresponding to the positive sample, and the positive sample can be spliced and then input into the second encoder.

The negative sample can be input into the second encoder to obtain the third distribution parameter. Or the label corresponding to the negative sample can be used as a condition for constraining the third semantic distribution. Adding the constraint condition is advantageous for the encoder to determine more accurate information, thereby improving an output of the encoder. Specifically, the label corresponding to the negative sample and the negative sample can be concatenated and then input into the second encoder to obtain the third distribution parameter. Or the original text and the label corresponding to the negative sample can be used as a condition for constraining the third semantic distribution. Specifically, the original text, the label corresponding to the negative sample, and the negative sample can be concatenated and then input into the second encoder to obtain the third distribution parameter. The concatenation can include splicing. For example, the label corresponding to the negative sample and the negative sample can be spliced and then input into the second encoder. For another example, the original text, the label corresponding to the negative sample, and the negative sample can be spliced and then input into the second encoder.

In some embodiments, the first distribution parameter, the second distribution parameter, and the third distribution parameter can alternatively be obtained by using only the encoder (i.e., the first encoder) in the text generative model. Specifically, the original text can be input into the encoder to obtain the first distribution parameter; the positive sample can be input into the encoder to obtain the second distribution parameter; and the negative sample can be input into the encoder to obtain the third distribution parameter. In some scenario examples, the text generative model can be a variational auto encoder.

Step S15: Optimize a model parameter of the encoder by using a loss function based on the first distribution parameter, the second distribution parameter, and the third distribution parameter, where the loss function includes a first term, and the first term is used to constrain a degree of similarity between the first semantic distribution and the second semantic distribution to be higher than a degree of similarity between the first semantic distribution and the third semantic distribution.

In some embodiments, loss information can be calculated based on the loss function; and the model parameter of the encoder can be optimized based on the loss information. For example, a gradient of the model parameter can be calculated by using a back propagation mechanism; and the model parameter can be adjusted based on the gradient.

In some embodiments, the loss function can include the first term. The first term is used to implement sentence-level contrastive learning. Specifically, the first term is used to constrain the degree of similarity between the first semantic distribution and the second semantic distribution to be higher than the degree of similarity between the first semantic distribution and the third semantic distribution. With the first term, the degree of similarity between the first semantic distribution and the second semantic distribution can be increased, and the degree of similarity between the first semantic distribution and the third semantic distribution can be decreased. Accordingly, the loss information can include a value of the first term. The value of the first term is used to represent a sentence-level contrastive loss.

A first distance between the first semantic distribution and the second semantic distribution can be calculated based on the first distribution parameter and the second distribution parameter; a second distance between the first semantic distribution and the third semantic distribution can be calculated based on the first distribution parameter and the third distribution parameter; and the value of the first term can be calculated based on the first distance and the second distance. The first distance and the second distance each are used to measure a degree of similarity between semantic distributions. The first distance and the second distance each can include a Kullback-Leibler (KL) divergence. Specifically, a smaller KL divergence indicates a higher degree of similarity between semantic distributions; and a larger KL divergence indicates a lower degree of similarity between semantic distributions. Certainly, the first distance and the second distance each can alternatively include a Jensen-Shannon (JS) divergence or the maximum mean discrepancy, etc.

For example, the first term can include a contrastive loss (Info Noise Contrastive Estimation loss, InfoNCE loss) function. The first term can be represented as an equation:

$$L_{ins} = -\log\left(1 - \frac{e^{h(f(y^+),f(x))/\tau}}{\sum_{y^*} \in Ye^{h(f(y^*),f(x))/\tau}}\right)$$

y* is y⁺ or y⁻. y⁺ represents the positive sample. y⁻ represents the negative sample. x represents the original text. f(x) represents the first semantic distribution. f(y⁺) represents the second semantic distribution. f(y⁻) represents the third semantic distribution. h(f(y⁺), f(x)) represents the KL divergence between the first semantic distribution and the second semantic distribution. h(f(y⁻), f(x))) represents the KL divergence between the first semantic distribution and the third semantic distribution. τ is a hyperparameter, used to represent a temperature coefficient. The equation here is merely an example, and the equation can further have other variants or variations in practical applications.

In some embodiments, a keyword can affect semantics expressed by a text. If a keyword in a text is slightly changed, for example, "cosmology" in the text is changed to "astrophysics", semantics expressed by the text can change significantly. Based on the previously described consideration, word-level contrastive learning can be introduced on the basis of the sentence-level contrastive learning to further improve a training effect. Specifically, an original keyword, a positive sample keyword, and a negative sample keyword can be determined respectively based on the original text, the positive sample, and the negative sample; and the model parameter of the encoder can be optimized by using the loss function based on the original keyword, the positive sample keyword, and the negative sample keyword. The loss function can further include a second term. The second term is used to implement word-level contrastive learning. Specifically, the second term is used to constrain a degree of similarity between the original keyword and the positive sample keyword to be higher than a degree of similarity between the original keyword and the negative sample keyword. With the second term, the degree of similarity between the original keyword and the positive sample keyword can be increased, and the degree of similarity between the original keyword and the negative sample keyword can be decreased. Accordingly, the loss information can further include a value of the second term. The value of the second term is used to represent a word-level contrastive loss.

At least one keyword can be extracted from the original text; and the extracted keyword can be used as the original keyword. At least one keyword can be extracted from the positive sample; and the extracted keyword can be used as the positive sample keyword. At least one keyword can be extracted from the negative sample; and the extracted keyword can be used as the negative sample keyword. Or the negative sample keyword can be determined by counterfeiting. Specifically, at least one keyword can be extracted from the negative sample as a reference keyword; a keyword network can be constructed based on the reference keyword and the positive sample keyword; one or more reference keywords adjacent to the positive sample keyword can be selected from the keyword network; and a keyword can be counterfeited as the negative sample keyword based on the selected reference keyword. As such, a negative sample keyword that is more difficult to recognize can be constructed with help of an adjacent reference keyword, thereby facilitating contrastive learning.

The keyword network can be constructed by using the reference keyword and the positive sample keyword as nodes. The keyword network can include nodes and edges. The nodes are used to represent keywords. The edges are used to represent associations between the keywords. The associations can be determined based on samples that the keywords belong to. Specifically, if two samples that two keywords belong to correspond to the same original text, the two keywords can have an association. Two nodes corresponding to the two keywords can be connected by using an edge. Further, the associations can include a positive association and a negative association. The edges can include a positive edge and a negative edge. The positive edge is used to represent the positive association. The negative edge is used to represent the negative association. Specifically, if two keywords are keywords of the same type, the two keywords can have a positive association. Two nodes corresponding to the two keywords can be connected by using a positive edge. If two keywords are keywords of different types, the two keywords can have a negative association.

Two nodes corresponding to the two keywords can be connected by using a negative edge. A type of a keyword can be determined based on a sample that the keyword belongs to. Specifically, if the sample that the keyword belongs to is a positive sample, the keyword can be a positive sample keyword. If the sample that the keyword belongs to is a negative sample, the keyword can be a reference keyword.

For each positive sample keyword, a reference keyword whose degree of proximity to the positive sample keyword is less than or equal to K degrees can be selected from the keyword network; and a keyword can be counterfeited as a negative sample keyword based on the selected reference keyword. The degree of proximity can be represented by using a quantity of degrees. The quantity of degrees can include a quantity of edges in the shortest path. For example, if the shortest path between two keywords includes K edges, it can be considered that a degree of proximity between the two keywords is K degrees. A value of K can be flexibly set based on actual needs, for example, can be 1, 2, 4, or 6.

During counterfeiting of the negative sample keyword, an embedding representation of the negative sample keyword can be calculated based on an embedding representation of the reference keyword. The embedding representation can include a vector. For example, the embedding representation of the negative sample keyword can be calculated based on an equation:

$$u_{imp} = \frac{\sum_{i=1}^{p} u_i}{p}.$$

P represents a quantity of reference keywords. $u_i$ represents an embedding representation of the $i^{th}$ reference keyword. For another example, the embedding representation of the negative sample keyword can alternatively be calculated based on an equation:

$$u_{imp} = \sum_{i=1}^{p} W_i u_i. \quad W_i$$

is used to represent a weight. $W_i$ can be an empirical value, or can be determined by machine learning.

A third distance between the original keyword and the positive sample keyword can be calculated based on an embedding representation of the original keyword and an embedding representation of the positive sample keyword; a fourth distance between the original keyword and the negative sample keyword can be calculated based on the embedding representation of the original keyword and an embedding representation of the negative sample keyword; and the value of the second term can be calculated based on the third distance and the fourth distance. The third distance and the fourth distance each are used to measure a degree of semantic similarity between the keywords. The third distance and the fourth distance each can include a cosine similarity. A smaller cosine similarity indicates a lower degree of semantic similarity between keywords. A larger cosine similarity indicates a higher degree of semantic similarity between keywords. The third distance and the fourth distance each can alternatively include a Hamming distance or an edit distance (Minimum Edit Distance), etc.

For example, the second term can include a contrastive loss (Info Noise Contrastive Estimation loss, InfoNCE loss) function. The second term can be represented as an equation:

$$L_{keyword} = -\log\left(\frac{e^{h(u_{in}, u_{out})/\tau}}{\sum_{u^*} \in Ue^{h(u_{in}, u_*)/\tau}}\right).$$

$u^*$ is $u_{out}$ or $u_{imp}$. $u_{in}$ represents the original keyword. $u_{out}$ represents the positive sample keyword. $u_{imp}$ represents the negative sample keyword. $h(u_{in}, u_{out})$ represents a cosine similarity between the original keyword and the positive sample keyword. $h(u_{in}, u_{imp})$ represents a cosine similarity between the original keyword and the negative sample keyword. The equation here is merely an example, and the equation can further have other variants or variations in practical applications.

It is worthwhile to note that an embedding representation of a keyword can be determined by using a one-hot encoding algorithm or a word2vec algorithm, etc. Or the embedding representation of a keyword can be determined by using other methods. The embedding representation of a keyword can include at least one of the following: the embedding representation of the original keyword, the embedding representation of the positive sample keyword, and the embedding representation of the negative sample keyword. For example, the embedding representation of a keyword can be determined based on the keyword network by using a semantic representation model. The semantic representation model can include a semantic representation module, a multilayer perceptron module, and a graph attention (GAT) module. The semantic representation module can include a Bidirectional encoder representations from transformer (BERT) model or an enhanced representation knowledge integration (ERNIE) model, etc. The semantic representation module is configured to output an embedding representation of a node in the keyword network. The multilayer perceptron module is configured to determine an embedding representation of an edge based on the embedding representation of the node. For example, an embedding representation of the $i^{th}$ node can be $h_i^0$, and an embedding representation of the $j^{th}$ node can be $h_j^0$. An embedding representation of an edge between the $i^{th}$ node and the $j^{th}$ node can be $r_{ij}^0 = FFN([h_i^0, h_j^0])$. [ ] represents splicing. FFN represents a function corresponding to a multilayer perceptron. The graph attention module is combined with the multilayer perceptron, and is configured to iteratively update the embedding representation of the node and the embedding representation of the edge. In each iteration, the embedding representation of the edge can be updated based on an equation: $r_{ij}^{t+1} = FFN(r_{ij}^t + p_{ij}^t)$; and the embedding representation of the node can be updated based on an equation: $u_i^{t+1} = \sum_{j \in N_i} \alpha_{ij}^t(h_j^t W_v + r_{ij}^{t+1})$. $r_{ij}^{t+1}$ represents an updated embedding representation of the edge. $r_{ij}^t$ represents the embedding representation before edge update.

$$p_{ij}^t = \beta_{ri}^t h_i^t + \beta_{rj}^t h_j^t. \quad \beta_{r*}^t = softmax\left(\frac{(r_{ij}^t W_p)(h_*^t W_h)^T}{\sqrt{d}}\right),$$

* is i or j. $u_i^{t+1}$ represents an updated embedding representation of the node.

$$\alpha_{ij}^t = \frac{\exp(e_{ij}^t)}{\sum_{l \in N_i} \exp(e_{il}^t)}. \quad e_{ij}^t = \frac{(h_i^t W_q)(h_j^t W_k + r_{ij}^{t+1} W_r)}{\sqrt{d}}.$$

$W_q$, $W_k$, $W_r$, and $W_v$ are model parameters, and $\alpha_{ij}^t$ represents an attention weight between $h_i^t$ and $h_j^t$.

In some embodiments, cross-level contrastive learning can be further introduced on the basis of the sentence-level contrastive learning and the word-level contrastive learning, thereby further improving the training effect. The loss function can further include a third term. The third term is used to implement the cross-level contrastive learning. Specifically, the third term is used to constrain a distance between the first semantic distribution and the positive sample keyword to be smaller than a distance between the first semantic distribution and the negative sample keyword. With the third term, the distance between the first semantic distribution and the positive sample keyword can be decreased, and the distance between the first semantic distribution and the negative sample keyword can be increased. Accordingly, the loss information can further include a value of the third term. The value of the third term is used to represent a cross-level contrastive loss.

A fifth distance between the first semantic distribution and the positive sample keyword can be calculated based on the first distribution parameter and the embedding representation of the positive sample keyword; a sixth distance between the first semantic distribution and the negative sample keyword can be calculated based on the first distribution parameter and the embedding representation of the negative sample keyword; and a loss of the third term can be calculated based on the fifth distance and the sixth distance. The fifth distance and the sixth distance each can include a Mahalanobis distance or a Euclidean distance, etc.

For example, the third term can include a contrastive loss (Info Noise Contrastive Estimation loss, InfoNCE loss) function. The third term can be represented as an equation:

$$L_{ma} = -\log\left(1 - \frac{e^{h(f(x),u_{out})/\tau}}{\sum_{u^* \in U} e^{h(f(x),u_*)/\tau}}\right).$$

$u^*$ is $u_{out}$ or $u_{imp}$. $u_{out}$ represents the positive sample keyword. $u_{imp}$ represents the negative sample keyword. $h(f(x), u_{out})$ represents a Mahalanobis distance between the first semantic distribution and the positive sample keyword. $h(f(x), u_{imp})$ represents a Mahalanobis distance between the first semantic distribution and the negative sample keyword. The equation here is merely an example, and the equation can further have other variants or variations in practical applications.

In some scenario examples, the loss function can include the first term, the second term, and the third term. Specifically, the loss function can be obtained by adding up the first term, the second term, and the third term. The loss information can include the value of the first term, the value of the second term, and the value of the third term.

In some embodiments, a model parameter of the decoder in the text generative model can be further optimized. Specifically, sampling can be performed on the first semantic distribution to obtain a latent variable; the latent variable can be input into the decoder; and the model parameter of the decoder can be optimized by using the loss function based on an output of the decoder and the positive sample. Specifically, the loss function can further include a fourth term, and the fourth term is used to constrain a degree of difference between the output of the decoder and the positive sample. The fourth term can include a cross-entropy loss function or a maximum likelihood loss (MLE) function, etc. Accordingly, the loss information can further include a value of the fourth term.

The latent variable can be a numerical value or a vector. Random sampling can be performed on the first semantic distribution to obtain the latent variable. Or sampling can be performed on the first semantic distribution by using other methods to obtain the latent variable. For example, the latent variable can be a latent vector. The first semantic distribution can be a normal distribution. The first distribution parameter can include a mean value $\mu$ and a variance $\sigma$. A reference vector $\varepsilon$ can be obtained by performing sampling on a standard normal distribution. The latent vector can be calculated based on an equation: $z = \mu + \sigma * \varepsilon$.

In some scenario examples, the loss function can include the first term, the second term, the third term, and the fourth term. Specifically, the loss function can be obtained by adding up the first term, the second term, the third term, and the fourth term. The loss information can include the value of the first term, the value of the second term, the value of the third term, and the value of the fourth term.

According to the model training method in the embodiments of this specification, the training effect can be improved by contrastive learning.

Embodiments of this specification further provide a text processing method. The text processing method can be applied to a computer device. The computer device includes, but is not limited to, a personal computer, a server, and a server cluster including multiple servers.

Figure 3:
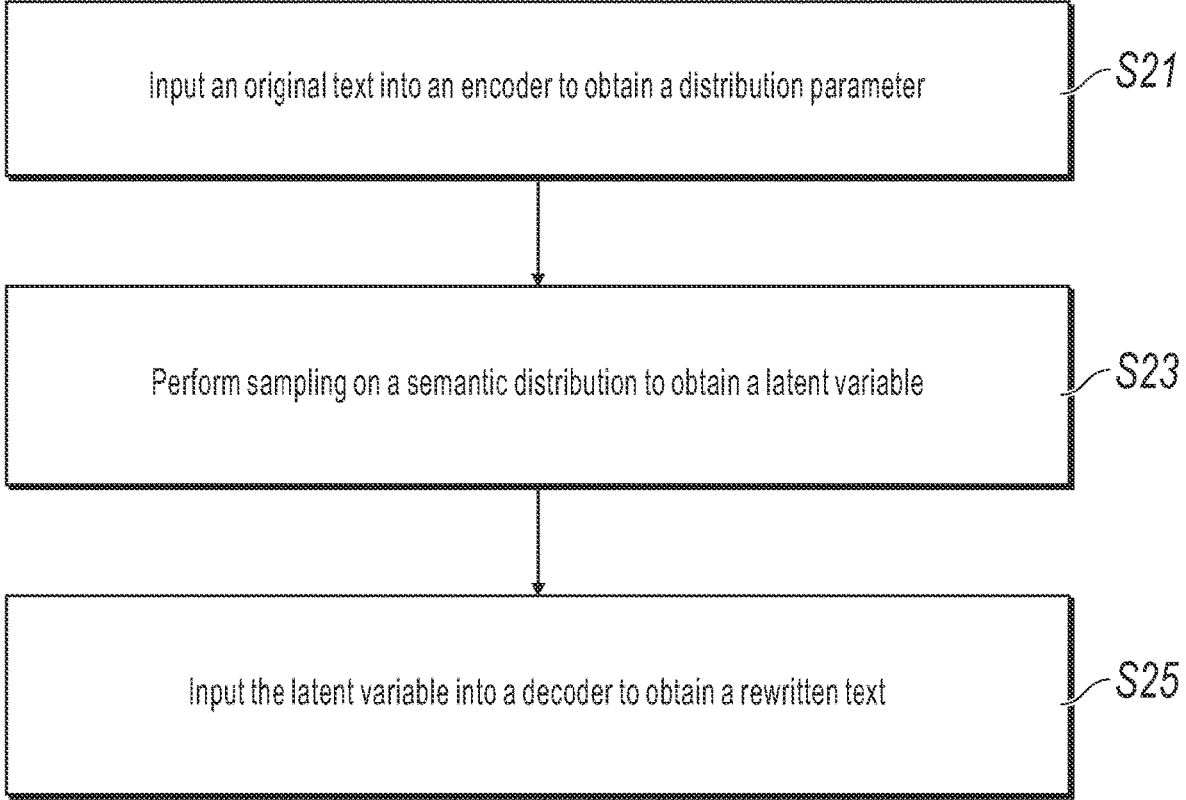
FIG. 3 is a schematic flowchart illustrating a text processing method, according to an embodiment of this specification.
Figure 4:
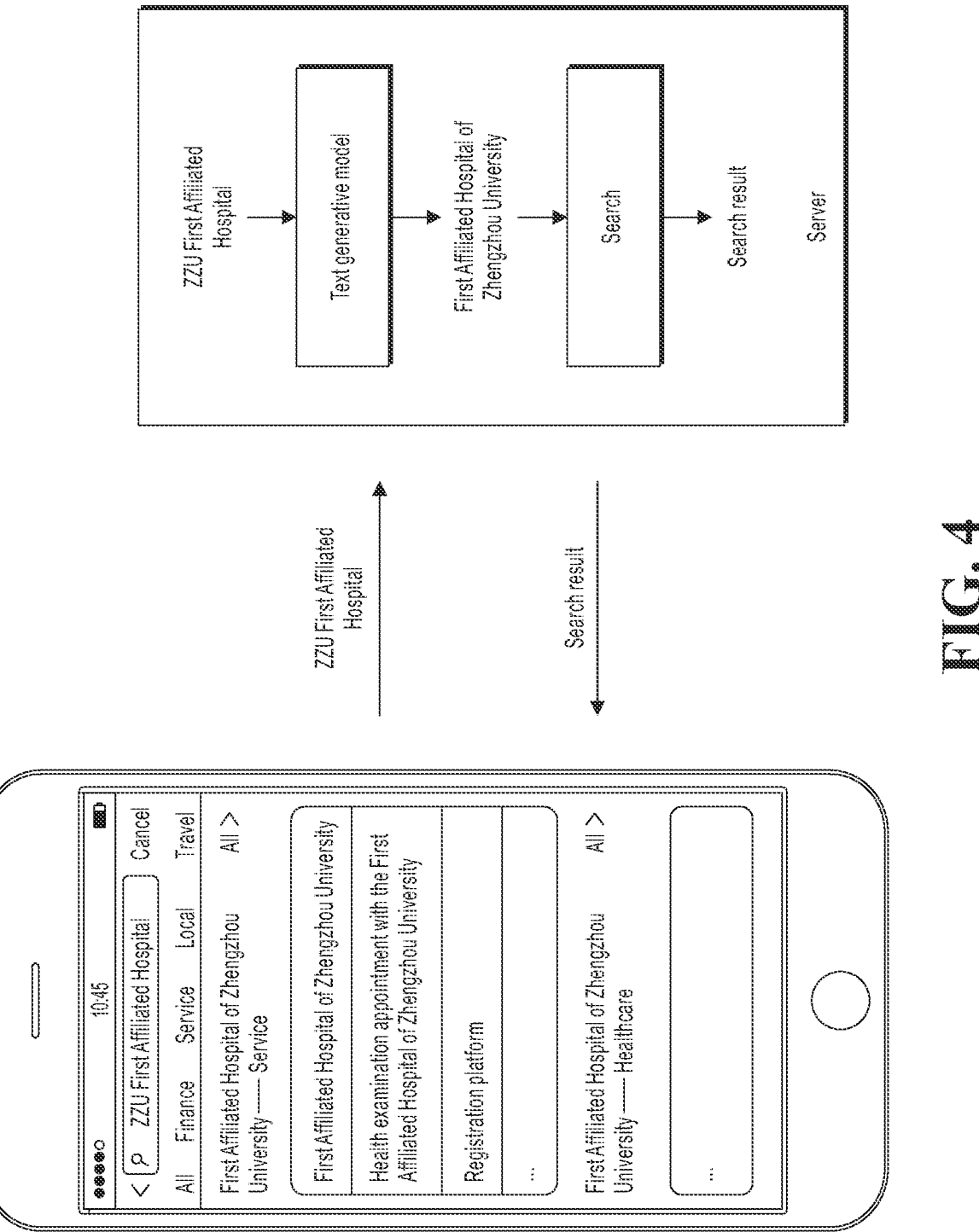
FIG. 4 is a schematic diagram illustrating a search scenario, according to an embodiment of this specification.

Reference can be made to FIG. 3 and FIG. 4. The text processing method can include the following steps.

Step S21: Input an original text into an encoder to obtain a distribution parameter.

Step S23: Perform sampling on a semantic distribution to obtain a latent variable.

Step S25: Input the latent variable into a decoder to obtain a rewritten text.

In some embodiments, the rewritten text corresponding to the original text can be generated based on a text generative model. Semantics of the rewritten text is the same as semantics of the original text. The semantics of the rewritten text is more accurate than the semantics of the original text. For example, the original text can be "ZZU First Affiliated Hospital". The rewritten text can be "First Affiliated Hospital of Zhengzhou University". For another example, the original text can be "query of newly launched automotives". The rewritten text can be "query of new automotive launch".

The text generative model can include an encoder and a decoder. The text generative model can be obtained through training based on the model training method in the previously described embodiments. Specifically, the encoder can be obtained through training based on the model training method in the previously described embodiments. The decoder can be obtained through training based on the model training method in the previously described embodiments, or can alternatively be obtained through training based on other methods. Step S21, step S23, and step S25 can be explained with reference to the previously described embodiments, and details are omitted here for simplicity.

In some embodiments, the text processing method can be applied to a search scenario. Specifically, a search text input by a user can be received as an original text; the original text can be input into the encoder to obtain a distribution parameter; sampling can be performed on a semantic distribution to obtain a latent variable; the latent variable can be input into the decoder to obtain a rewritten text; a search can be performed based on the rewritten text; and a search result can be fed back to the user. Such practice can improve quality of the search result, thereby improving user experience.

Or the text processing method can also be applied to an interactive question-and-answer scenario. Specifically, a consultative question input by a user can be received as an original text; the original text can be input into the encoder to obtain a distribution parameter; sampling can be performed on a semantic distribution to obtain a latent variable; the latent variable can be input into the decoder to obtain a rewritten text; answer information can be obtained based on the rewritten text; and the answer information can be fed back to the user. Such practice can improve quality of an answer, thereby improving user experience.

According to the text processing method in the embodiments of this specification, a text can be rewritten.

Figure 5:
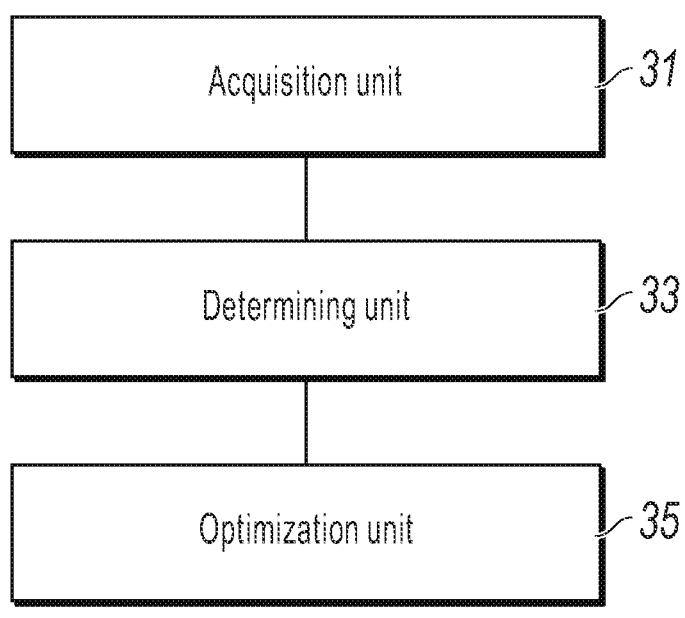
FIG. 5 is a schematic structural diagram illustrating a model training apparatus, according to an embodiment of this specification.

Reference can be made to FIG. 5. Embodiments of this specification further provide a model training apparatus, including the following units:

an acquisition unit 31, configured to obtain an original text, a positive sample, and a negative sample, where the positive sample and the negative sample are rewritten texts of the original text;

a determining unit 33, configured to determine, by using an encoder, a first distribution parameter corresponding to the original text, a second distribution parameter corresponding to the positive sample, and a third distribution parameter corresponding to the negative sample, where the first distribution parameter is used to describe a first semantic distribution, the second distribution parameter is used to describe a second semantic distribution, and the third distribution parameter is used to describe a third semantic distribution; and an optimization unit 35, configured to optimize a model parameter of the encoder by using a loss function based on the first distribution parameter, the second distribution parameter, and the third distribution parameter, where the loss function includes a first term, and the first term is used to constrain a degree of similarity between the first semantic distribution and the second semantic distribution to be higher than a degree of similarity between the first semantic distribution and the third semantic distribution.

Figure 6:
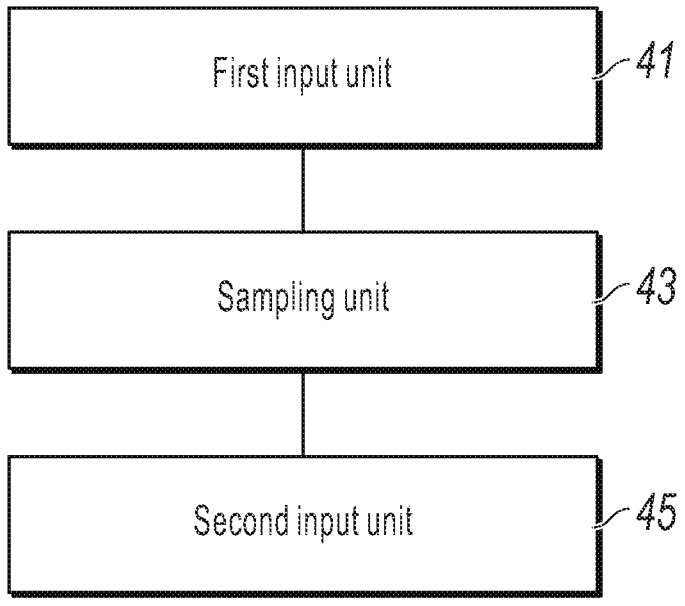
FIG. 6 is a schematic structural diagram illustrating a text processing apparatus, according to an embodiment of this specification.

Reference can be made to FIG. 6. Embodiments of this specification further provide a text processing apparatus, including the following units:

a first input unit 41, configured to input an original text into an encoder to obtain a distribution parameter, where the encoder is obtained through training based on the model training method in the previously described embodiments, and the distribution parameter is used to describe a semantic distribution;

a sampling unit 43, configured to perform sampling on the semantic distribution to obtain a latent variable; and a second input unit 45, configured to input the latent variable into a decoder to obtain a rewritten text.

Figure 7:
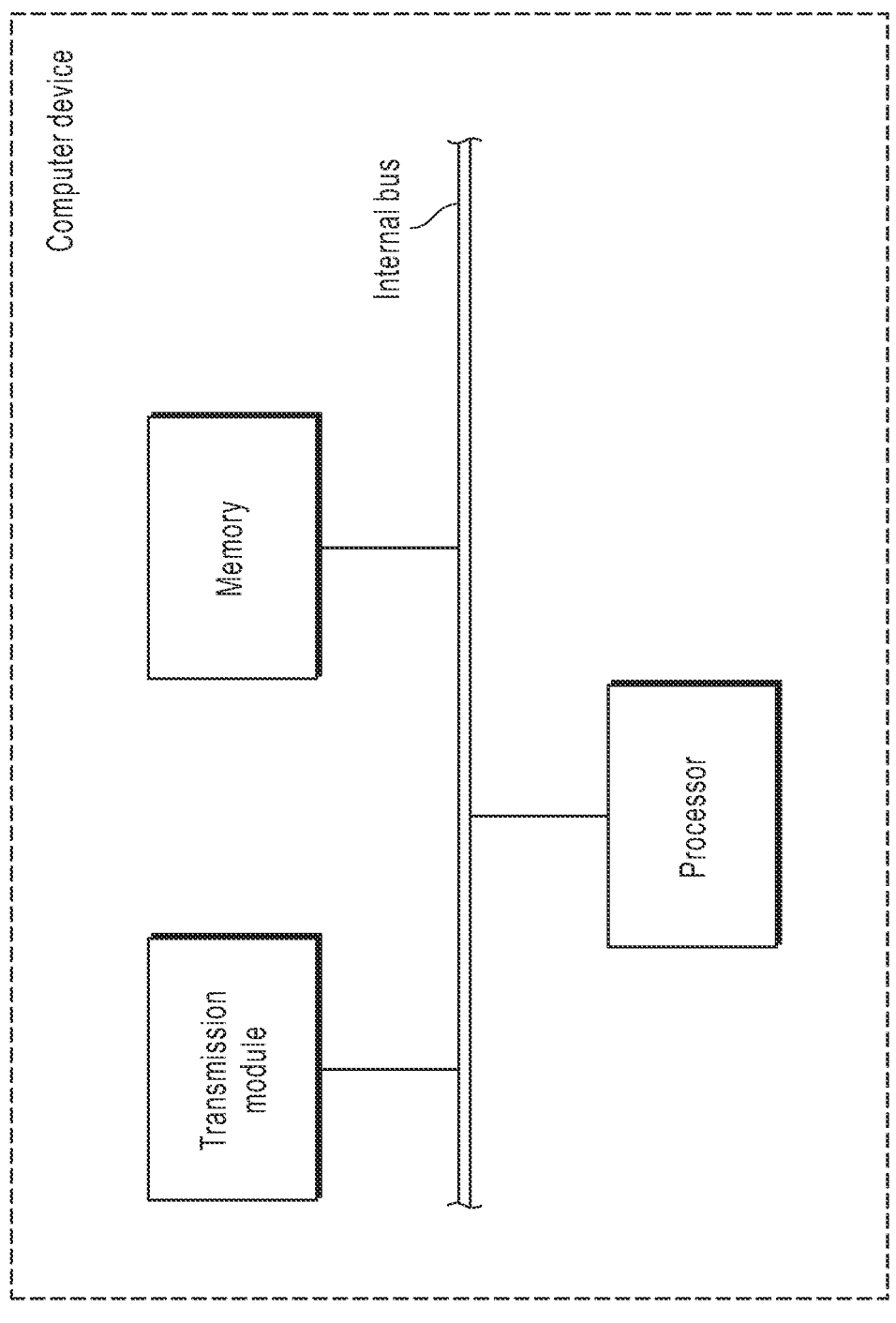
FIG. 7 is a schematic structural diagram illustrating a computer device, according to an embodiment of this specification.

Embodiments of the computer device in this specification are described below. FIG. 7 is a schematic structural diagram illustrating a hardware structure of the computer device in the embodiments. As shown in FIG. 7, the computer device can include one or more (only one is shown) processors, a memory, and a transmission module. Certainly, a person of ordinary skill in the art can understand that the hardware structure shown in FIG. 7 is merely illustrative and does not constitute a limitation on the hardware structure of the previously described computer device. In practice, the computer device can alternatively include more or fewer component units than the units shown in FIG. 7, or have a configuration different from the configuration shown in FIG. 7.

The memory can include a high-speed random access memory, or can further include a nonvolatile memory such as one or more magnetic storage apparatuses, flash memories, or other nonvolatile solid state memories. Certainly, the memory can further include a remotely disposed network memory. The memory can be configured to store program instructions or modules of application software, for example, the program instructions or modules in the embodiments corresponding to FIG. 1 or FIG. 3 of this specification.

The processor can be implemented in any suitable way. For example, the processor can be in a form of a microprocessor or a processor and a computer readable medium storing computer readable program code (such as software or firmware) that can be executed by the (micro) processor, a logic gate, a switch, an application specific integrated circuit (ASIC), a programmable logic controller, an embedded microcontroller, etc. The processor can read and execute the program instructions or modules in the memory.

The transmission module can be configured to perform data transmission via a network, for example, via a network such as the Internet, an enterprise intranet, a local area network, or a mobile communication network.

This specification further provides embodiments of a computer storage medium. The computer storage medium includes, but is not limited to, a random access memory (RAM), a read-only memory (ROM), a cache, a hard disk drive (HDD), and a memory card. The computer storage medium stores computer program instructions. When the computer program instructions are executed, the program instructions or modules in the embodiments corresponding to FIG. 1 or FIG. 3 of this specification can be implemented.

It is worthwhile to note that the embodiments in this specification are described in a progressive way. For the same or similar parts of the embodiments, references can be made to the embodiments mutually. Each embodiment focuses on a difference from other embodiments. In particular, for the apparatus embodiments, the computer device embodiments, and the computer storage medium embodiments, since they are substantially similar to the method embodiments, the description is relatively simple, and reference can be made to a partial description of the method embodiments. In addition, it can be understood that, after reading this specification document, a person skilled in the art can figure out any combination of some or all of the embodiments enumerated in this specification without creative effects. These combinations also fall within the scope disclosed and protected by this specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit (ASIC) chip. In addition, at present, instead of manually manufacturing an integrated circuit chip, this type of programming is mostly implemented by using "logic compiler" software. The software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

The system, apparatus, module, or unit illustrated in the above-mentioned embodiments can be implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

It can be seen from the descriptions of the implementations that a person skilled in the art can clearly understand that this specification can be implemented by using software and a necessary general hardware platform. Based on such an understanding, the technical solutions in this specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, or a network device, etc.) to perform the methods described in the embodiments or in some parts of the embodiments of this specification.

This specification can be applied to many general-purpose or dedicated computer system environments or configurations, for example, a personal computer, a server computer, a handheld device or a portable device, a tablet device, a multi-processor system, a microprocessor-based system, a set-top box, a programmable consumption electronic device, a network PC, a minicomputer, a mainframe computer, and a distributed computing environment including any one of the above-mentioned systems or devices.

This specification can be described in the general context of computer-executable instructions, for example, a program module. Generally, the program module includes a routine, a program, an object, a component, a data structure, etc. executing a specific task or implementing a specific abstract data type. This specification can alternatively be practiced in distributed computing environments in which tasks are performed by remote processing devices that are connected through a communications network. In a distributed computing environment, the program module can be located in both local and remote computer storage media including storage devices.

Although this specification is described by using the embodiments, a person of ordinary skill in the art knows that many variants and variations of this specification can be made without departing from the spirit of this specification. It is expected that the appended claims include these variants and variations without departing from the spirit of this specification.

What is claimed is:

1. A computer-implemented method, comprising:

obtaining an original text, a positive sample, and a negative sample, wherein the positive sample and the negative sample are rewritten texts of the original text;

determining, by using an encoder, a first distribution parameter corresponding to the original text, a second distribution parameter corresponding to the positive sample, and a third distribution parameter corresponding to the negative sample, wherein the first distribution parameter is used to describe a first semantic distribution, the second distribution parameter is used to describe a second semantic distribution, and the third distribution parameter is used to describe a third semantic distribution;

determining an original keyword, a positive sample keyword, and a negative sample keyword respectively based on the original text, the positive sample, and the negative sample; and optimizing a model parameter of the encoder by using a loss function based on the first distribution parameter, the second distribution parameter, the third distribution parameter, the original keyword, the positive sample keyword, and the negative sample keyword, wherein the loss function comprises a first term and a second term, the first term is used to constrain a degree of similarity between the first semantic distribution and the second semantic distribution to be higher than a degree of similarity between the first semantic distribution and the third semantic distribution, and the second term is used to constrain a degree of similarity between the original keyword and the positive sample keyword to be higher than a degree of similarity between the original keyword and the negative sample keyword.

2. The computer-implemented method according to claim 1, wherein the encoder comprises a first encoder and a second encoder, the first encoder is an encoder in a text generative model, and the second encoder is used to assist in training of the text generative model; and wherein determining the first distribution parameter, the second distribution parameter, and the third distribution parameter comprises:

obtaining, by using the first encoder, the first distribution parameter corresponding to the original text; and obtaining, by using the second encoder, the second distribution parameter corresponding to the positive sample and the third distribution parameter corresponding to the negative sample.

3. The computer-implemented method according to claim 2, wherein:

determining the first distribution parameter comprises:

concatenating a keyword in the original text and the original text, and performing input into the first encoder to obtain the first distribution parameter; and determining the second distribution parameter and the third distribution parameter comprises:

concatenating the original text, a label corresponding to the positive sample, and the positive sample, and performing input into the second encoder to obtain the second distribution parameter; and concatenating the original text, a label corresponding to the negative sample, and the negative sample, and performing input into the second encoder to obtain the third distribution parameter.

4. The computer-implemented method according to claim 1, wherein determining the negative sample keyword comprises:

extracting a keyword from the negative sample as a reference keyword;

constructing a keyword network based on the reference keyword and the positive sample keyword;

selecting one or more reference keywords adjacent to the positive sample keyword from the keyword network; and constructing the negative sample keyword based on the one or more reference keywords.

5. The computer-implemented method according to claim 1, wherein the loss function further comprises a third term, and the third term is used to constrain a distance between the first semantic distribution and the positive sample keyword to be smaller than a distance between the first semantic distribution and the negative sample keyword.

6. The computer-implemented method according to claim 1, wherein each of the first distribution parameter, the second distribution parameter, and the third distribution parameter comprises a mean value and a variance, and the first semantic distribution, the second semantic distribution, and the third semantic distribution are normal distributions.

7. The computer-implemented method according to claim 1, wherein the computer-implemented method further comprises:

performing sampling on the first semantic distribution to obtain a latent variable;

inputting the latent variable into a decoder; and optimizing a model parameter of the decoder by using the loss function based on an output of the decoder and the positive sample, wherein the loss function further comprises a fourth term, and the fourth term is used to constrain a degree of difference between the output of the decoder and the positive sample.

8. A computer-implemented method, comprising:

inputting an original text into an encoder to obtain a first distribution parameter, wherein the encoder is obtained through training by:

obtaining the original text, a positive sample, and a negative sample, wherein the positive sample and the negative sample are rewritten texts of the original text;

determining, by using the encoder, the first distribution parameter corresponding to the original text, a second distribution parameter corresponding to the positive sample, and a third distribution parameter corresponding to the negative sample, wherein the first distribution parameter is used to describe a first semantic distribution, the second distribution parameter is used to describe a second semantic distribution, and the third distribution parameter is used to describe a third semantic distribution;

determining an original keyword, a positive sample keyword, and a negative sample keyword respectively based on the original text, the positive sample, and the negative sample; and optimizing a model parameter of the encoder by using a loss function based on the first distribution parameter, the second distribution parameter, the third distribution parameter, the original keyword, the positive sample keyword, and the negative sample keyword, wherein the loss function comprises a first term and a second term, and the first term is used to constrain a degree of similarity between the first semantic distribution and the second semantic distribution to be higher than a degree of similarity between the first semantic distribution and the third semantic distribution, and the second term is used to constrain a degree of similarity between the original keyword and the positive sample keyword to be higher than a degree of similarity between the original keyword and the negative sample keyword;

performing sampling on the first semantic distribution to obtain a latent variable; and inputting the latent variable into a decoder to obtain a rewritten text.

9. The computer-implemented method according to claim 8, wherein the decoder is obtained through training by:

optimizing a model parameter of the decoder by using the loss function based on an output of the decoder and the positive sample, wherein the loss function further comprises a fourth term, and the fourth term is used to constrain a degree of difference between the output of the decoder and the positive sample.

10. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining an original text, a positive sample, and a negative sample, wherein the positive sample and the negative sample are rewritten texts of the original text;

determining, by using an encoder, a first distribution parameter corresponding to the original text, a second distribution parameter corresponding to the positive sample, and a third distribution parameter corresponding to the negative sample, wherein the first distribution parameter is used to describe a first semantic distribution, the second distribution parameter is used to describe a second semantic distribution, and the third distribution parameter is used to describe a third semantic distribution;

determining an original keyword, a positive sample keyword, and a negative sample keyword respectively based on the original text, the positive sample, and the negative sample; and optimizing a model parameter of the encoder by using a loss function based on the first distribution parameter, the second distribution parameter, the third distribution parameter, the original keyword, the positive sample keyword, and the negative sample keyword, wherein the loss function comprises a first term and a second term, the first term is used to constrain a degree of similarity between the first semantic distribution and the second semantic distribution to be higher than a degree of similarity between the first semantic distribution and the third semantic distribution, and the second term is used to constrain a degree of similarity between the original keyword and the positive sample keyword to be higher than a degree of similarity between the original keyword and the negative sample keyword.

11. The computer-implemented system according to claim 10, wherein the encoder comprises a first encoder and a second encoder, the first encoder is an encoder in a text generative model, and the second encoder is used to assist in training of the text generative model; and wherein determining the first distribution parameter, the second distribution parameter, and the third distribution parameter comprises:

obtaining, by using the first encoder, the first distribution parameter corresponding to the original text; and obtaining, by using the second encoder, the second distribution parameter corresponding to the positive sample and the third distribution parameter corresponding to the negative sample.

12. The computer-implemented system according to claim 11, wherein:

determining the first distribution parameter comprises:

concatenating a keyword in the original text and the original text, and performing input into the first encoder to obtain the first distribution parameter; and determining the second distribution parameter and the third distribution parameter comprises:

concatenating the original text, a label corresponding to the positive sample, and the positive sample, and performing input into the second encoder to obtain the second distribution parameter; and concatenating the original text, a label corresponding to the negative sample, and the negative sample, and performing input into the second encoder to obtain the third distribution parameter.

13. The computer-implemented system according to claim 10, wherein determining the negative sample keyword comprises:

extracting a keyword from the negative sample as a reference keyword;

constructing a keyword network based on the reference keyword and the positive sample keyword;

selecting one or more reference keywords adjacent to the positive sample keyword from the keyword network; and constructing the negative sample keyword based on the one or more reference keywords.

14. The computer-implemented system according to claim 10, wherein the loss function further comprises a third term, and the third term is used to constrain a distance between the first semantic distribution and the positive sample keyword to be smaller than a distance between the first semantic distribution and the negative sample keyword.

15. The computer-implemented system according to claim 10, wherein each of the first distribution parameter, the second distribution parameter, and the third distribution parameter comprises a mean value and a variance, and the first semantic distribution, the second semantic distribution, and the third semantic distribution are normal distributions.

16. The computer-implemented system according to claim 10, wherein the one or more operations further comprise:

performing sampling on the first semantic distribution to obtain a latent variable;

inputting the latent variable into a decoder; and optimizing a model parameter of the decoder by using the loss function based on an output of the decoder and the positive sample, wherein the loss function further comprises a fourth term, and the fourth term is used to constrain a degree of difference between the output of the decoder and the positive sample.

* * * * *